United States Patent [19]
Smith

[11] 3,885,659
[45] May 27, 1975

[54] SEGMENTAL FRICTION MEMBER FOR BRAKE OR CLUTCH

[75] Inventor: Billy N. Smith, Troy, Ohio

[73] Assignee: The B. F. Goodrich Company, Akron, Ohio

[22] Filed: Sept. 24, 1973

[21] Appl. No.: 400,014

[52] U.S. Cl. ........ 192/107 R; 188/218 XL; 403/294
[51] Int. Cl. ............................................ F16d 13/64
[58] Field of Search ........... 192/107 R; 188/218 XL

[56] References Cited
UNITED STATES PATENTS

| | | | |
|---|---|---|---|
| 2,423,881 | 7/1947 | Bois | 192/107 R X |
| 2,423,882 | 7/1947 | Frank | 188/218 XL |
| 3,422,936 | 1/1969 | Marcheron | 192/107 R X |
| 3,473,637 | 10/1969 | Rutt | 192/107 R |
| 3,550,740 | 12/1970 | Le Blanc et al. | 192/107 R |
| 3,698,519 | 10/1972 | Crossman | 192/107 R X |

*Primary Examiner*—Benjamin W. Wyche
*Attorney, Agent, or Firm*—John D. Haney; Frederick K. Lacher

[57] ABSTRACT

An annular stator or rotor of a brake or clutch mechanism having sector-shaped segmental members for frictional engagement with other parts of the mechanism. Torque links connecting adjacent segmental members have locking portions movable into interlocked positions in the segmental members. Each torque link has flanges providing channels therebetween for engaging splines of a torque transmitting body. Removable pins extending through the torque links into the segmental members prevent movement of the torque link locking portions out of the interlocked positions in the segmental members.

5 Claims, 3 Drawing Figures

3,885,659
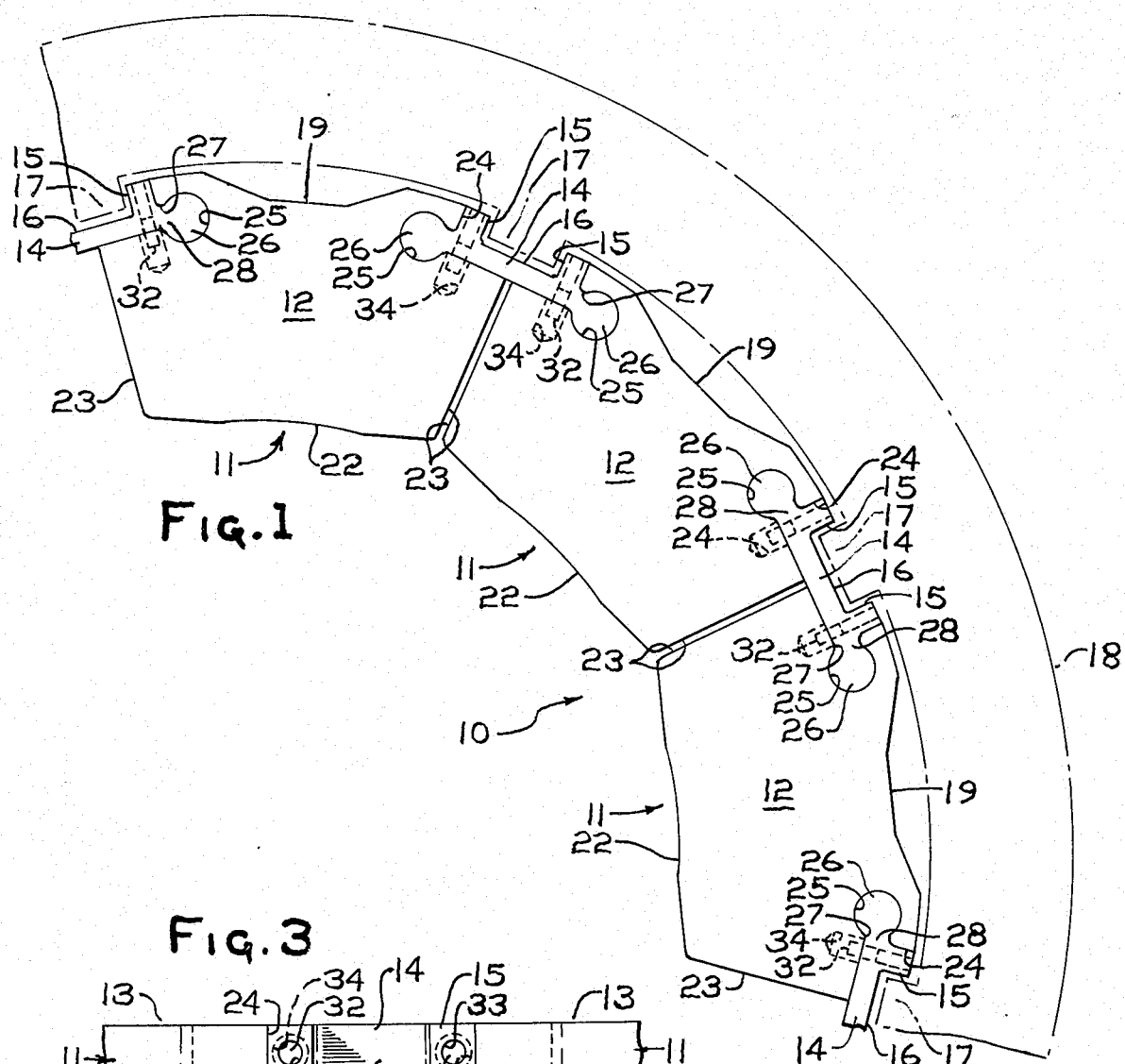
Fig.1
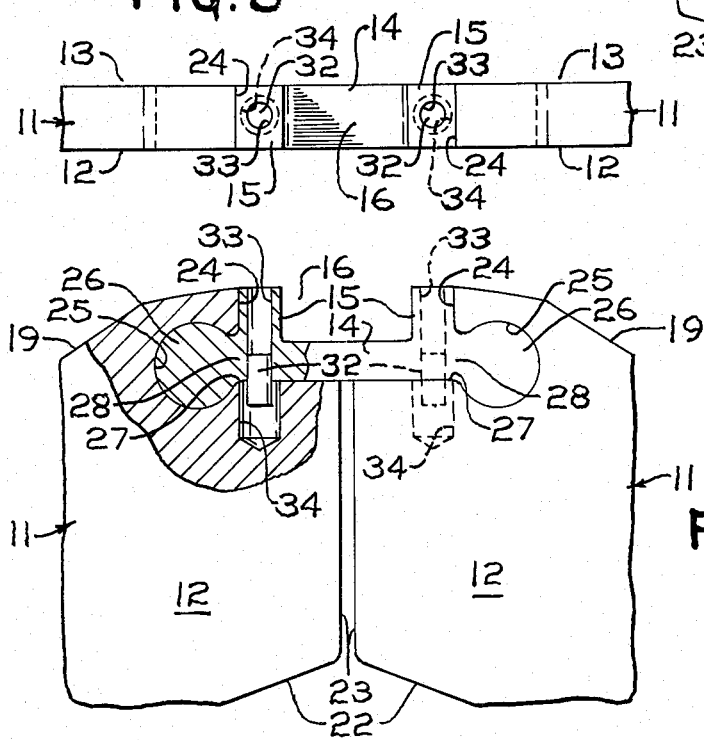
Fig.3
Fig.2

SEGMENTAL FRICTION MEMBER FOR BRAKE OR CLUTCH

BACKGROUND OF THE INVENTION

This invention relates to annular segmented friction members for disc type brakes or clutches. A segmented friction member assembled according to this invention may be used as one element of a friction couple in a brake or clutch and may be employed as a so-called heat-sink element in a high energy brake such as that used for aircraft. In the present application, the invention is applied to a friction member used as a rotor heat-sink disc in an aircraft brake.

Specifically, this invention is directed to the segmented friction member described in the assignee's earlier filed U.S. Pat. No. 3,550,740 in which a series of individual segments are connected one to another by torque link members. These link members are located outside the high temperature zones swept during the engagement of the segments and serve the dual function of providing driving engagement with the associated parts of the mechanism and connecting of the segments.

Although the torque link and segmented friction member construction set forth in this patent has proved to be very effective, the friction members and torque links have been connected by rivets extending through thin ear sections of the links and segmented members. This connection has not provided the desired strength and wear characteristics in some cases and therefore presented a problem.

In order to provide the necessary strength, the segmented friction member has also been limited to a minimum thickness of twice the minimum thickness of the torque link ear attachment. This has also created a problem where it was desirable to have a segmented friction member of a lesser thickness but with the same strength.

SUMMARY OF THE INVENTION

According to this invention, an annular segmented friction member is provided in which the segments are connected by torque link members with locking portions movable into interlocked position in the segments. With this interlocked connection the torque link members and segments may have a uniform thickness throughout and avoid the structural disadvantage of relatively thin ears at the connecting portions. In the plane of rotation the torque link members and segments are held together by the interlocking design. In the plane perpendicular to the plane of rotation of the disc member, movement of the torque link members out of the interlocked position is prevented by pins extending through the torque link members into the segments.

The torque link members have flanges in abutting relation with the edges of the segments providing additional stability to the annular segmental friction member as well as a channel for slidable engagement with a spline of an associated rotatable brake member.

The accompanying drawings show one preferred form of a segmented friction member made in accordance with and embodying this invention and which is representative of how this invention may be practiced in the design of segmented friction members.

BRIEF DESCRIPTION OF THE DRAWINGS

In the drawings:

FIG. 1 is a side view of a part of an annular friction member (shown in solid lines), certain parts being broken away, and illustrated in torque driving engagement with a related part which in this example may be a rotatable wheel, the sides of which are represented by the chain-dotted lines;

FIG. 2 is an enlarged fragmentary view of the interlocked torque link and segmented friction member connection with parts being cut away to show the internal details of the connection in one of the friction segments.

FIG. 3 is a plan view of the torque link connection shown in FIG. 2 with parts being broken away.

DETAILED DESCRIPTION

Referring to FIG. 1, a segmented friction member 10 embodying the invention has a series of arcuate sector-shaped friction segments 11 which are annularly disposed providing annular friction faces 12 and 13 on opposite sides of the friction member for engagement with the friction faces of other friction members of a brake or clutch assembly. The friction segments 11 have a uniform thickness between friction faces 12 and 13 throughout the extent of the segments. Torque links 14 interconnect the friction segments 11 and have flanges 15 providing channels 16 for mating interfitting driving engagement with splines 17 on an associated rotatable member which in this example may be a wheel rim 18 shown in chain-dotted lines.

Each of the friction segments 11 has an outer peripheral edge 19, an inner peripheral edge 22 and radially extending edges 23. A recess 24 is cut out of the corner of the outer peripheral edge 19 and the radially extending edges 23. Adjacent the recesses 24, the friction segments 11 have shaped slots 25 for receiving torque link locking portions such as shaped end portions 26. Passages 27 in the friction segments 11 extend between the recesses 24 and the slots 25 through which necked portions 28 of the torque links 14 extend from the flanges 15 to the end portions 26. In the present embodiment, the end portions 26 are cylindrical for sliding axially into cylindrical slots 25 in the friction segments 11.

In order to retain the torque links 14 in the interlocked position shown in the drawings and prevent axial movement out of the interlocked positions, roll pins 32 are forced through holes 33 in flanges 15 with a press fit to the position shown in FIG. 2 partially extended into holes 34 in the friction segments 11. The holes 34 have a diameter substantially greater than the diameter of the roll pins 32 and accordingly no torque forces are transmitted through the pins which serve only to prevent movement of the torque links 14 out of the interlocked position in the friction segments 11.

As shown in FIG. 2, the roll pins 32 have a length less than the depth of the holes 34 in the friction segments 11 so that when it is desired to remove the torque links 14, this may be done by driving the roll pins 32 out of the holes 33 in the flanges 15 into the holes 34 which will free the torque links for sliding movement out of the interlocked positions.

As shown in FIG. 3, the torque links 14 have a uniform thickness which is preferably the same as the thickness of the friction segments 11.

Although the torque links 14 and friction segments 11 are shown with interlocking connections having a necked cylindrical shape, other shapes such as hexagonal, octagonal and oval may also be used within the scopy of this invention.

I, therefore, particularly point out and distinctly claim as my invention:

1. A segmented friction member for a brake or clutch having a series of annularly disposed friction segments forming an annular friction face, a torque link member connecting adjacent friction segments at positions near the radially outer edges, said torque link having locking portions movable into interlocked positions with said adjacent friction segments, spline driving means on said torque link engageable with an associated brake or clutch structure, said locking portions of said torque link having shaped end portions and said adjacent friction segments having shaped slots for retaining said end portions in locked relationship, said shaped end portions being movable axially of said annular friction face into said shaped slots and pin means extending through said torque link and into said adjacent friction segments to retain said torque link in said interlocked position.

2. A segmented friction member according to claim 1 wherein said spline driving means further comprises flanges for engaging the sides of said spline and said pin means extending through said flanges into said friction segments.

3. A segmented friction member according to claim 2 wherein said flanges have holes for said pins of substantially the same diameter as said pins providing a press fit and said friction segments have holes for said pins of a greater diameter than said pins providing a loose fit whereby substantially no torque load will be transmitted through said pins.

4. A segmented friction member according to claim 3 wherein the depth of said holes in said friction segments are greater than the length of said pins whereby said pins can be driven into said holes in said friction segments to disassemble said friction member.

5. A segmented friction member for a brake or clutch having a series of annularly disposed friction segments forming an annular friction face, a torque link connecting adjacent friction segments at positions near the radially outer edges, said torque link having enlarged integral locking end portions movable into interlocked positions with said adjacent friction segments, spline driving means extending radially outward of said friction member from said torque link between said end portions engageable with an associated brake or clutch structure, said integral locking end portions of said torque link having shaped end portions, said adjacent friction segments having shaped slots for retaining said end portions in locked relationship, each of said segments being of arcuate sector shape with an outer peripheral edge, an inner peripheral edge and radially diverging side edges, each of said segments having recesses at the outer peripheral edge at the corners to receive said links, a necked passage between each of said shaped slots and said recesses for receiving a connecting portion of said torque link, said spline driving means further comprising flanges extending across the axial thickness of said torque link and friction member for engaging the sides of a spline of an associated brake or clutch structure and abutting side edges of said recesses across the axial thickness of said friction segments.

* * * * *